United States Patent
Zhang

[19]

[11] Patent Number: 6,139,146
[45] Date of Patent: Oct. 31, 2000

[54] PROGRAMMABLE CORRECTIVE LENSES

[75] Inventor: Xiaoxiao Zhang, Suwanee, Ga.

[73] Assignee: Novartis AG, Basel, Switzerland

[21] Appl. No.: 09/200,689

[22] Filed: Nov. 27, 1998

Related U.S. Application Data

[63] Continuation-in-part of application No. 09/196,990, Nov. 20, 1998, which is a continuation-in-part of application No. 08/999,371, Dec. 29, 1997.

[51] Int. Cl.⁷ ...................................................... G02C 7/04
[52] U.S. Cl. .................................. 351/160 R; 351/160 H; 351/177; 359/19
[58] Field of Search .......................... 351/160 R, 160 H, 351/161, 162, 177; 359/19

[56] References Cited

U.S. PATENT DOCUMENTS

| | | | |
|---|---|---|---|
| 4,210,391 | 7/1980 | Cohen | 351/161 |
| 4,637,697 | 1/1987 | Freeman | 351/161 |
| 4,641,934 | 2/1987 | Freeman | 351/159 |
| 4,642,112 | 2/1987 | Freeman | 623/6 |
| 4,655,565 | 4/1987 | Freeman | 351/159 |
| 4,913,990 | 4/1990 | Rallison | 430/30 |
| 4,978,183 | 12/1990 | Vick | 350/3.67 |

(List continued on next page.)

FOREIGN PATENT DOCUMENTS

| | | |
|---|---|---|
| 0 037 476 | 3/1981 | European Pat. Off. . |
| 0 404 099 | 6/1990 | European Pat. Off. . |
| 0 407 772 | 6/1990 | European Pat. Off. . |
| 0 407 773 | 6/1990 | European Pat. Off. . |
| 0 435 525 A2 | 12/1990 | European Pat. Off. . |
| 0 470 811 | 8/1991 | European Pat. Off. . |
| 0 570 120 | 4/1993 | European Pat. Off. . |
| 2 139 375 | 4/1984 | United Kingdom . |
| WO 94/12909 | 11/1993 | WIPO . |
| WO 94/23334 | 7/1994 | WIPO . |
| WO 96/10971 | 10/1995 | WIPO . |
| WO 96/24075 | 1/1996 | WIPO . |
| WO 97/10527 | 9/1996 | WIPO . |
| WO 97/13183 | 9/1996 | WIPO . |

OTHER PUBLICATIONS

Analysis of Multiple Hologram Optical Elements with Low dispersion and Low Aberrationis, John N. Latta, Appled Optics, vol. 11(8), pp. 1686–1696 (Aug. 1972).

Bandwith of Holographic Optical Elements, Thomas Stone and Nicholas George, Optics Letters, pp. 445–447, vol. 7, No. 9 (Sep. 1982).

Compensating Optical Systems. Part 1: Broadband Holographic Reconstruction, Robert H. Katyl, Applied Optics, May 1972, vol. 11, No. 5, pp. 1241–1247.

Coupled Wave Theory for Thick Hologram Gratings, Herwig Kogeinik, The Bell System Technical Journal, vol. 48, No. 9, pp. 2909–2944, Nov. 1969.

(List continued on next page.)

*Primary Examiner*—Scott J. Sugarman
*Attorney, Agent, or Firm*—R. Scott Meece; Robert J. Gorman, Jr.

[57] ABSTRACT

The invention provides an ophthalmic lens, which uses a volume HOE to provide an optical power. The ophthalmic lens is produced by a highly flexible production process such that a variety of different ametropic conditions can be accommodated.

16 Claims, 5 Drawing Sheets

U.S. PATENT DOCUMENTS

| | | | |
|---|---|---|---|
| 5,016,977 | 5/1991 | Baude et al. | 351/160 R |
| 5,037,166 | 8/1991 | Malcolm et al. | 359/15 |
| 5,066,301 | 11/1991 | Wiley | 623/6 |
| 5,071,207 | 12/1991 | Ceglio et al. | 359/15 |
| 5,082,337 | 1/1992 | Chern et al. | 359/15 |
| 5,100,226 | 3/1992 | Freeman | 351/160 |
| 5,103,323 | 4/1992 | Magarinos et al. | 359/8 |
| 5,108,169 | 4/1992 | Mandell | 351/161 |
| 5,116,111 | 5/1992 | Simpson et al. | 351/161 |
| 5,162,927 | 11/1992 | Moss et al. | 359/3 |
| 5,178,636 | 1/1993 | Silberman | 351/161 |
| 5,182,180 | 1/1993 | Gambogi et al. | 430/1 |
| 5,235,441 | 8/1993 | Georgaras et al. | 359/15 |
| 5,257,132 | 10/1993 | Ceglio et al. | 359/565 |
| 5,291,316 | 3/1994 | Haberman | 359/13 |
| 5,296,881 | 3/1994 | Freeman | 351/177 |
| 5,331,132 | 7/1994 | Freeman | 219/121.69 |
| 5,331,445 | 7/1994 | Dickson et al. | 359/15 |
| 5,351,321 | 9/1994 | Snitzer et al. | 385/10 |
| 5,351,324 | 9/1994 | Forman | 385/37 |
| 5,422,745 | 6/1995 | Williams et al. | 359/3 |
| 5,424,828 | 6/1995 | Minami | 356/348 |
| 5,432,623 | 7/1995 | Egan | 369/102 |
| 5,443,507 | 8/1995 | Jacobi | 623/6 |
| 5,450,378 | 9/1995 | Hekker | 369/102 |
| 5,508,317 | 4/1996 | Mueller | 522/85 |
| 5,523,993 | 6/1996 | Freeman | 369/109 |
| 5,553,091 | 9/1996 | Delorme | 372/50 |
| 5,568,496 | 10/1996 | Justus et al. | 372/11 |
| 5,582,474 | 12/1996 | Van Order et al. | 362/74 |
| 5,587,847 | 12/1996 | Chiang et al. | 359/890 |
| 5,602,657 | 2/1997 | Dickman et al. | 359/15 |
| 5,612,986 | 3/1997 | Howells et al. | 378/34 |

OTHER PUBLICATIONS

Eye Contact GRIN Lenses, Yasuhiro Koike, Grandient Index Optical Systems, 1994 Technical Digest, Series vol. 12, pp. 87–93 (Jul. 1994).

Higher Diffraction Orders in On–axis Holographic Lenses, R.R.A. Syms and L. Solymar, Applied Optics, vol. 21 (18), pp. 3264–3268 (Sep. 1982).

History of Holography, Paul Kirkpatrick, SPIE Seminary Proceedings, vol. 15, pp. 9–19, 1968.

Holography: A Day in the Life, Holography Market Place, 5th Ed., B. Kluepfel, A. Rhody, F. Ross, pp. 147–154 (Oct. 1995).

Holography Takes On A Practical Look, Tung H. Jeong, Laser Focus World, pp. 89–99, Jul. 1989.

Hybrid Diffractive–Refractive lenses and Achromats, Thomas Stone and Nicholas George, Applied optics, vol. 27 (14), pp. 2960–2971, Jul. 1988.

Image Evaluation of Ophthalmi Devices, David S. Loshin, Optometry and Vision Science, vol. 6y7, No. 8, pp. 617–621, 1990.

Lens Aberration by Holography (correction), Teruji Ose, et al., pp. 57–69.

The Holographic Bifocal Contact Lens, Suzanne St. Cyr, Holospher, 15, 5, 14 pp. 14–24, 1988.

Wavelength Performance of Holographic Optical Elements, Thomas Stone and Nicholas George, Applied Optics, Nov. 1985, Vol. 24, No. 22, pp. 3797–3810.

PROGRAMMABLE CORRECTIVE LENSES

BACKGROUND OF THE INVENTION

This application is a continuation-in-part of copending application Ser. No. 09/196,990, filed Nov. 20, 1998, entitled ACTIVELY CONTROLLABLE MULTIFOCAL LENS, which is a continuation-in-part of 08/999,371, filed Dec. 29, 1997. The specification of copending application Ser. No. 09/196,990 is herein incorporated by reference.

The present invention relates to a corrective optic lens containing a volume holographic element. More specifically, the present invention relates to a corrective optic lens having a holographic element that provides an optical power.

Optic lenses for correcting ametropia and other adverse vision conditions using the refractive power of optically clear polymers are widely available. Ametropia is the term that indicates a condition of refractive visual impairment of the eye, including myopia, hyperopia, prebyopia and astigmatism. Commonly used corrective optic lenses include spectacle lenses and ophthalmic lenses.

Ophthalmic lenses for correcting ametropia include contact lenses and intraocular lenses. Because each ametropic condition requires a specific corrective power, there need to be a large number of different designs for ophthalmic lenses to accommodate many different visual defects of the eye. For example, in order to accommodate different levels of myopic conditions with contact lenses, a range of different spherical power contact lenses having from 0 to −10 diopters or even lower, usually in quarter diopter increments, are produced. The accommodation difficulty is particularly severe for correcting astigmatic conditions since astigmatic conditions require not only power adjustments but also cylindrical axis adjustments. In addition, a corrective lens for astigmatism must have a stabilization mechanism, e.g., prism ballast or slab-off, to properly align the axis of the lens on the eye. Consequently, many different design criteria must be considered to produce a toric lens that properly accommodates the ametropic condition and is comfortable to wear.

There remains a need for a corrective lens that is simple to design and produced by a simpler production process than the conventional ophthalmic lens production processes.

SUMMARY OF THE INVENTION

The present invention provides an ophthalmic lens which has a transmission volume holographic element, and the volume holographic element has a grating structure which provides an optical power. Also provided is an ophthalmic lens for correcting astigmatism. The corrective lens for astigmatism has a volume holographic element that provides a cylindrical corrective power. Suitable ophthalmic lenses having the volume holographic element include contact lenses and intraocular lenses.

The ophthalmic lens is produced by a highly flexible production method since the corrective power or powers of the lens is provided by programming suitable powers into the lens, without the need for changing the dimensions of the lens. Accordingly, a wide range of different corrective powers can be provided, and the ophthalmic lenses can be designed to promote the comfort of the lens wearer without the optical constraints of the prior art lens design.

DETAILED DESCRIPTION OF THE INVENTION

The ophthalmic lens of the present invention can be programmed to provide a wide variety of different optical powers and configurations, and thus, the lens is highly suitable for correcting various ametropic conditions. Exemplary ametropic conditions that can be corrected with the present lens include myopia, hyperopia, presbyopia, regular and irregular astigmatisms and combinations thereof.

Figure 1:
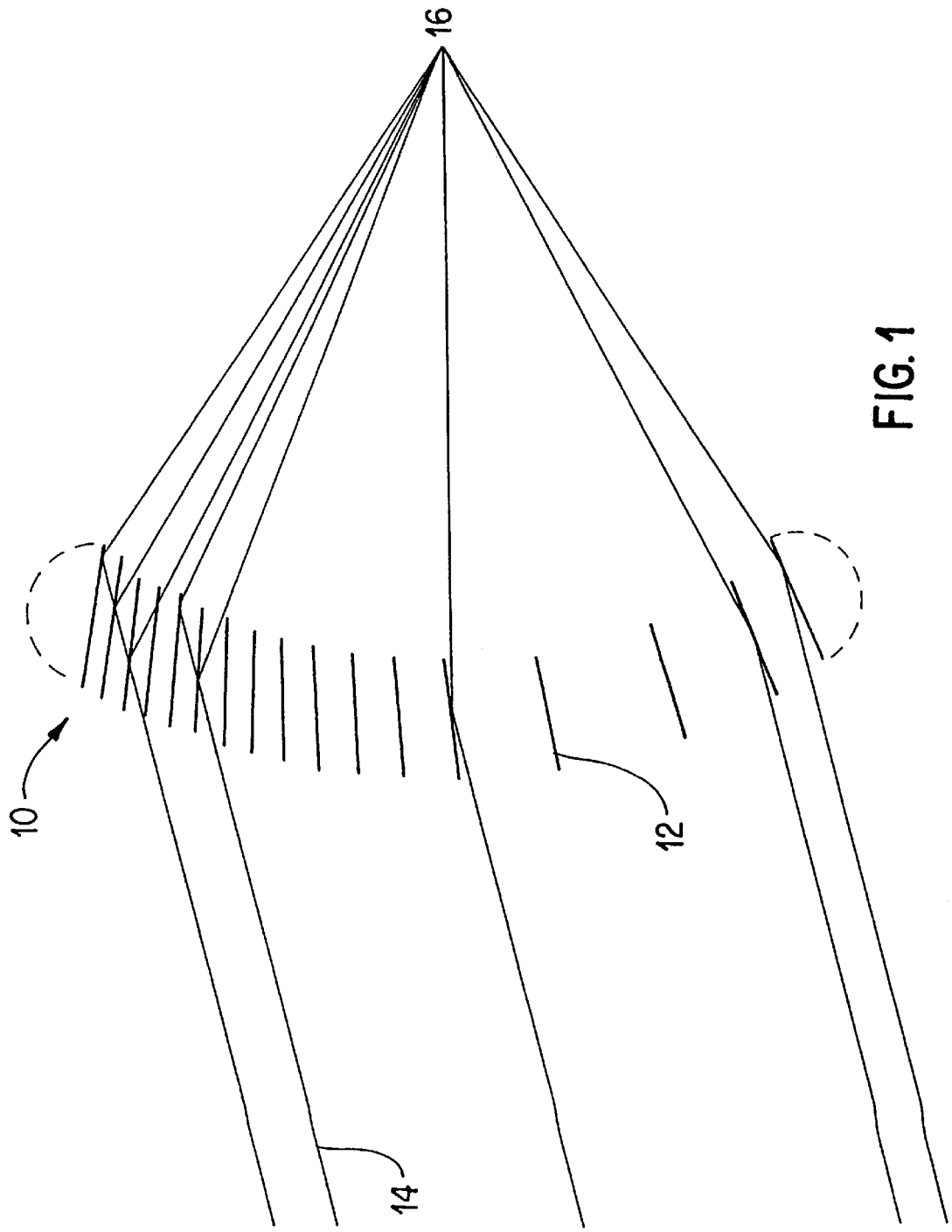
FIG. 1 illustrates a corrective ophthalmic lens of the present invention.

The ophthalmic lens utilizes the diffractive property of a holographic optical element (HOE), more particularly a transmission volume HOE, to provide an optical power. The volume HOE of the present invention contains interference fringe patterns, i.e., a volume grating structure, that are programmed or recorded as a periodic variation in the refractive index of the optical material. The volume grating structure diffracts the light that enters the HOE and, the path of the light is modified and redirected to a desired direction. FIG. 1 illustrates an exemplary HOE 10 that is suitable for the present invention, which has a converging or plus optical power. The HOE lens 10 has a volume grating structure 12, and the grating structure 12 directs the light 14, which enters the lens 10 from one side, to focus on a focal point 16, which is located on the other side of the lens 10. Preferably, the incoming light 14 is diffracted by more than one interference fringe 12 and redirected to the focal point 16 such that high diffraction efficiency is achieved.

Figure 2:
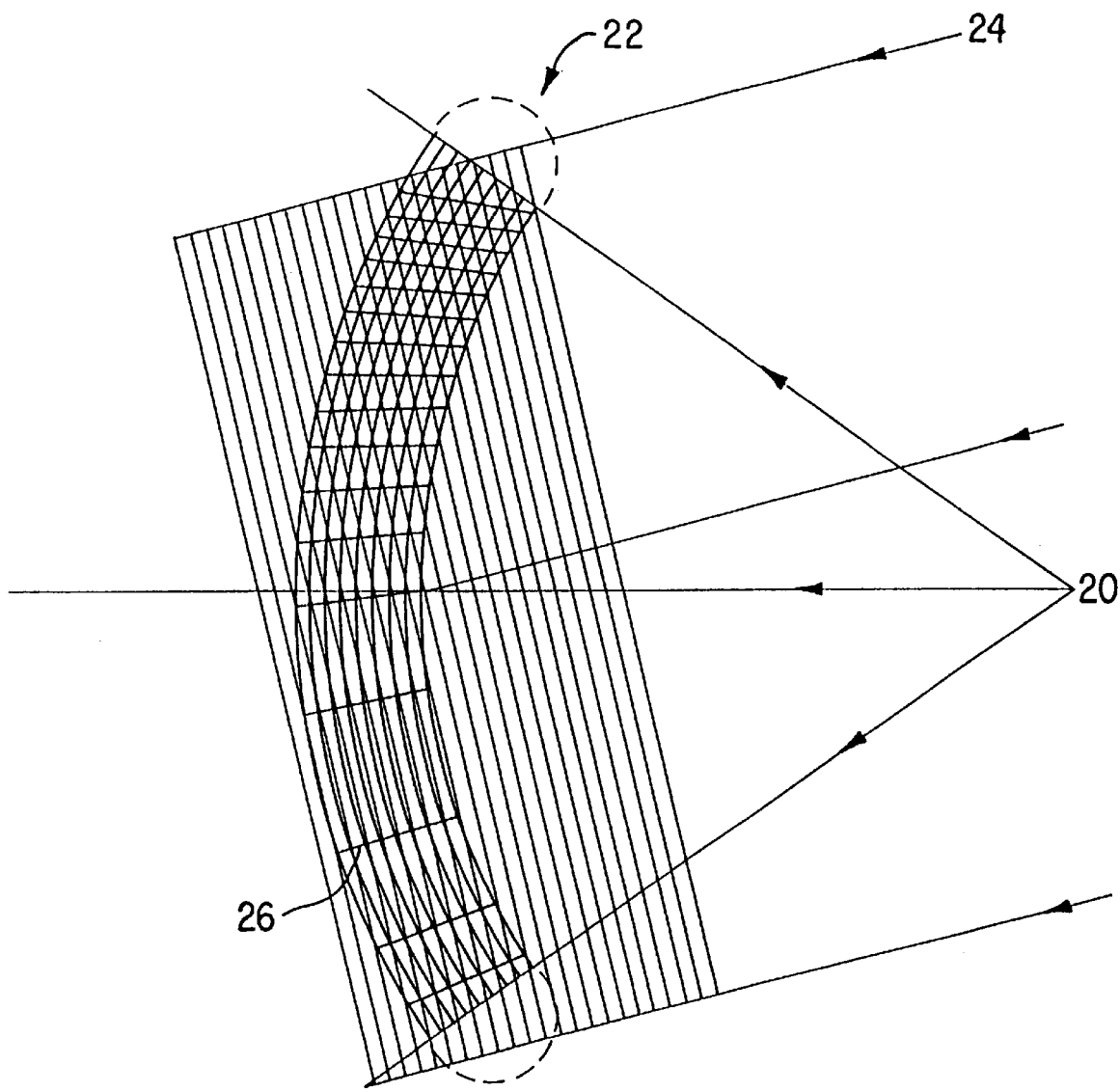
FIG. 2 illustrates a method for producing a volume holographic optical element of the present invention.

FIG. 2 illustrates a process for producing or programming a volume HOE that provides a converging power. HOEs suitable for the present invention can be produced, for example, from polymerizable or crosslinkable optical materials and photographic hologram recording media. Suitable optical materials are further discussed below. Hereinafter, for illustration purposes, the term "polymerizable materials" is used to indicate both polymerizable materials and crosslinkable materials, unless otherwise indicated. Point-source light (first light) 20 and collimated light (second light) 24 are simultaneously projected to a photopolymerizable optical material (i.e., photopolymerizable HOE) 22 such that the electromagnetic waves of the first light 20 and the second light 24 form interference fringe patterns, which are recorded in the polymerizable optical material as the optical material is polymerized. The photopolymerizable HOE 22 is a photopolymerizable material that is polymerized by both the first light and the second light. Preferably, the first light and the second light are produced from one collimated light source using a beam splitter such that the first light and the second light are coherent. As the two split portions of the light are projected toward the HOE 22, the path of the first portion of the split light is modified to form a point-source light 20. The point-source first light 20 is provided, for example, by placing a conventional convex optical lens some distance away from the photopolymerizable HOE 22 such that one portion of the split light is focused on a desirable distance away from the HOE 22, i.e., on the point-source light position 20 of FIG. 2. The first light and the second light coherently enter the HOE 22 and record an interference fringe pattern (i.e., volume grating structure 26). The fully recorded and polymerized HOE 22 has a focal point, which corresponds to the originating position of the point-source light 20, when light enters the HOE from the opposite side of the focal point. In accordance with the present invention, the power of the ophthalmic lens can be changed, for example, by changing the distance and the position of the first light 20. According to the present invention, a preferred light source for the first and second light is a laser source, more preferred is a UV laser source. Although the suitable wavelength of the light source depends on the type of HOE employed, preferred wavelength ranges are between 300 nm and 600 nm.

As can be appreciated, HOEs having a diverging corrective power can also be produced with the above-described HOE production set up with some modifications. For example, a convergent first light source that forms a focal point on the other side of the HOE away from the light source can be used in place of the point-source first light to produce an HOE having a negative corrective power.

Figure 3:
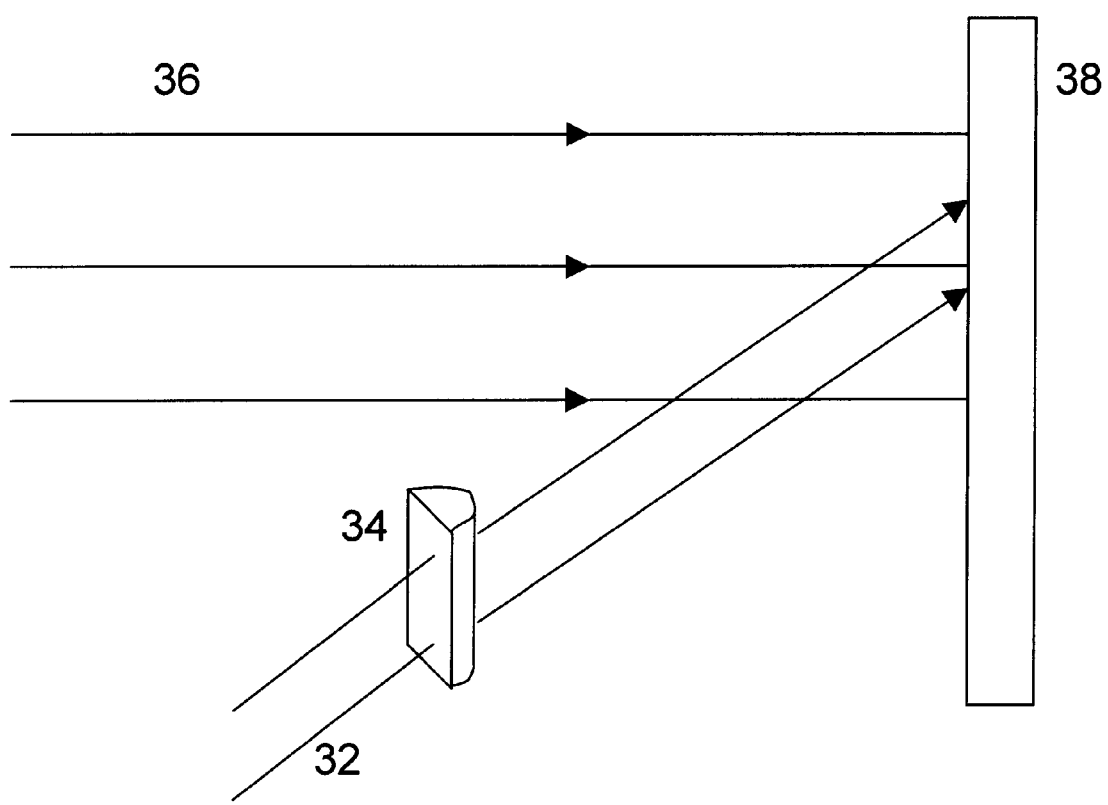
FIG. 3 illustrates a method for producing a toric HOE ophthalmic lens.

Turning to FIG. 3, there is provided an exemplary process for programming a cylindrical power that is suitable for correcting an astigmatic visual condition. A grating structure programming set up similar to the above-discussed process for producing an HOE having a converging corrective power can be used, except that the point-source first light is replaced by a line-source first light. The line-source first light is provided by modifying collimated light 32 with cylindrical optical lens 34 which is vertically placed some distance away from a polymerizable optical material 38. The cylindrical lens 34 does not modify the path of the light 32 in the vertical direction (i.e., axis meridian) with respect to the cylindrical lens 34, while it significantly modifies the path of the light 32 in the horizontal direction (i.e., power meridian) to focus the light to a focal point. Again, the first light 32 and the second light 36 are simultaneously directed to the polymerizable optical material 38 to record a volume grating structure, thereby forming a HOE lens with a cylindrical or toric optical power. The location of the focal point, which is provided by the cylindrical lens 34, can be changed to provide different converging and diverging optical powers. For example, when a programmed HOE lens is designed to receive visual light from the opposite side of the programming light sources and is designed to provide a converging power in the power meridian, the path of the first light should be modified to focus to a point that is located in front of the polymerizable optical material 38 during the programming process. In addition, the rotational orientation of the cylindrical lens 34 with respect to the polymerizable optical material 38 can be changed to impart a wide variety of cylindrical power orientations. Accordingly, the production process for producing the toric HOE lens is a highly flexible process that can produce a wide variety of toric lenses.

Although FIG. 3 illustrates a process for producing a toric HOE lens for regular astigmatism, the process can be easily modified to produce a corrective lens for irregular astigmatism. A corrective lens for irregular astigmatism can be produced by employing an irregular cylindrical lens to modify the path of the first light, in place of the regular cylindrical lens 34. For example, a cylindrical lens that provides an acute or obtuse angle between the axis of the power meridian and the axis of the axis meridian produces a toric HOE lens for irregular astigmatism.

The toric HOE lens is highly advantageous over conventional toric ophthalmic lenses, e.g., toric contact lenses. Unlike a conventional toric contact lens, the HOE lens does not have to change its dimensions to accommodate differing corrective needs of different astigmatic conditions, e.g., cylindrical orientation, power requirement and position of the stabilization mechanism. The toric HOE lens can be designed to optimize the comfort of the wearer since the corrective power of the lens is flexibly programmed into the lens and is not produced by the geometric shape of the lens. It is to be noted that although the corrective power of the HOE lens does not rely on the geometric shape of the lens, the geometric shape of the lens can be utilized to provide an additional optical power or to complement the programmed optical power. For example, the shape of the lens can be designed to provide an additional refractive power, e.g., plus or minus spherical power.

Figure 4:
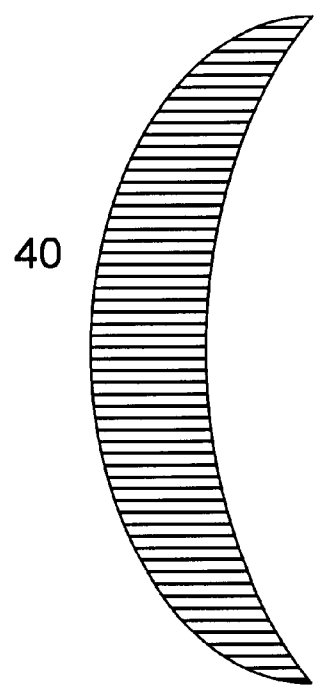
FIG. 4 illustrates an ophthalmic lens of the present invention.

FIG. 4 illustrates an exemplary HOE lens design of the present invention. In this embodiment, an HOE bifocal active lens 40 is produced from an optical material that forms an HOE. The programmed volume grating structure of the HOE lens provides an optical power, and as discussed above, the combination of the shape of the HOE lens and the refractive index of the HOE material may provide a complementary or an additional optical power. This HOE lens embodiment is particularly suitable when the HOE material employed is a biocompatible material and, thus, does not adversely interact with body tissues. The term "biocompatible material" as used herein refers to a polymeric material that does not deteriorate appreciably and does not induce a significant immune response or deleterious tissue reaction, e.g., toxic reaction or significant irritation, over time when implanted into or placed adjacent to the biological tissue of a subject. Preferably, a biocompatible material does not deteriorate and does not cause immune response or deleterious tissue reaction over at least 6 months, more preferably at least 1 year, most preferably at least 10 years. Suitable biocompatible optical materials are highly photocrosslinkable or photopolymerizable optical materials. Suitable biocompatible materials include derivatives and copolymers of a polyvinyl alcohol, polyethyleneimine, or polyvinylamine. Exemplary biocompatible materials that are particularly suitable for producing the HOE of the present invention are disclosed in U.S. Pat. No. 5,508,317 to Müller and International Patent Application No. PCT/EP96/00246 to Mühlebach, which patent and patent application are herein incorporated by reference and further discussed below.

The HOE ophthalmic lens 40 may have a stabilizing mechanism (not shown), especially when the lens 40 is designed as a contact lens for correcting astigmatism. For example, a prism ballast may be added to the bottom of the lens, a slab-off is provided at the top of the lens, or a top and bottom double slab-off design is used to properly and stably orient the cylindrical axis of the toric lens to match the astigmatic condition of an eye. In addition, as discussed above, the shape of the lens 40 and the inherent index of refraction of the HOE material may provide an additional optical power.

Figure 5:
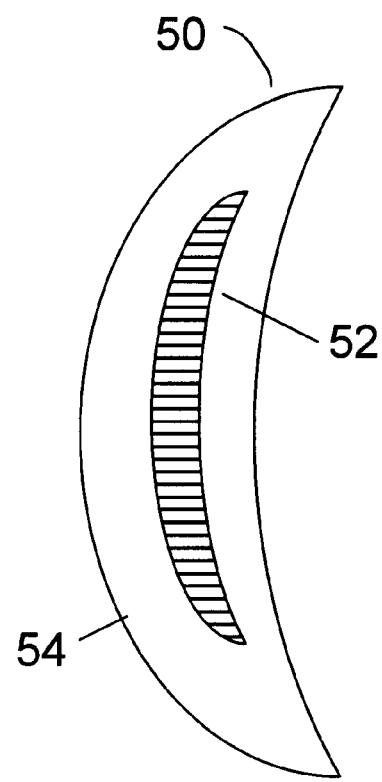
FIG. 5 illustrates an ophthalmic lens of the present invention.
Figure 6:
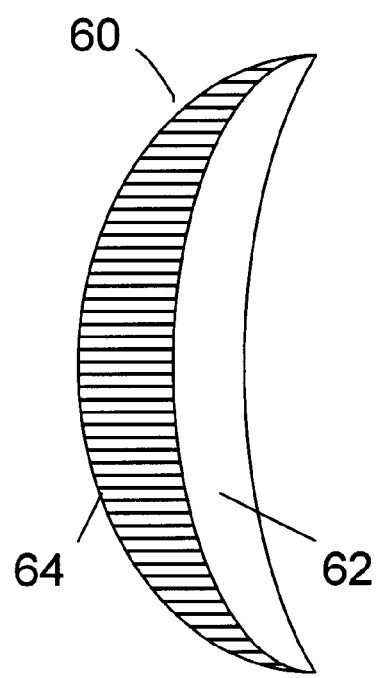
FIG. 6 illustrates an ophthalmic lens of the present invention.

Another lens design embodiment is illustrated in FIG. 5. The composite lens 50 has an HOE 52 embedded or encapsulated in a first optical material 54, preferably a biocompatible optical material. This composite lens embodiment is particularly suitable when the HOE 52 is made from an optical material that is not suitably biocompatible. Yet anther embodiment is illustrated in FIG. 6. The composite HOE lens 60 has a first optical lens 62 and an HOE lens 64, which is adjacently placed over the first optical lens 62. Alternatively, the HOE lens 64 can be of a size that covers only the pupil of the eye, and the placement of the first optical lens 62 and the HOE lens 64 can be interchanged. The first optical lens 62 from a first optical material and the HOE lens 64 from an HOE material can be fabricated separately and joined, e.g., adhesively or thermally. Alternatively, the first optical lens 62 and the HOE lens 64 can be sequentially or simultaneously fabricated one over the other such that a composite lens is produced. This sequential or simultaneous approach is particularly suitable when the first optical lens and the HOE lens are produced from one basic material or two chemically compatible materials.

In accordance with the present invention, suitable HOEs can be produced from polymerizable and crosslinkable optical materials that can be relatively rapidly photopolymerized or photocrosslinked, especially a fluid optical material. Hereinafter, for illustration purposes, the term polymerizable material is used to indicate both polymerizable and crosslinkable materials, unless otherwise indicated. A rapidly polymerizable optical material allows a periodic variation in the refractive index can be created within the optical material, thereby forming a volume grating structure while the optical material is being polymerized to form a solid optical material. When a fluid polymerizable optical material is used to produce the HOE, the light source transforms the fluid optical material to a non-fluid or solid HOE while forming the volume grating structure. The term "fluid" as used herein indicates that a material is capable of flowing like a liquid. Preferably, suitable polymerizable and crosslinkable optical materials are selected from biocompatible optical materials, and preferably, suitable optical materials are selected from fluid biocompatible optical materials that crosslink or polymerize to form a non-fluid, solidified optical element having a defined shape in equal to or less than 5 minutes, more preferably equal to or less than 3 minutes, yet more preferably equal to or less than 1 minute, most preferably equal to or less than 30 seconds, e.g., between 5 and 30 seconds. The duration of crosslinking or polymerization is determined by placing a crosslinkable or polymerizable optical material between two quartz slides, which have the dimensions of a microscope slide and are separated by 100 μm with spacers. A sufficient amount of the optical material is applied on a first quartz slide to form a circular drop having a diameter of about 14 mm, and a second slide is placed over the optical material. Alternatively, a spacer can be used to provide the cylindrical space between the slides for the optical material. The optical material between the slides is irradiated with a 200 watt medium pressure mercury arc lamp which is placed 18 cm above the top quartz slide.

An exemplary group of biocompatible polymerizable optical materials suitable for the present invention is disclosed in U.S. Pat. No. 5,508,317 to Müller. A preferred group of polymerizable optical materials, as described in U.S. Pat. No. 5,508,317, are those that have a 1,3-diol basic structure in which a certain percentage of the 1,3-diol units have been modified to a 1,3-dioxane having in the 2-position a radical that is polymerizable but not polymerized. The polymerizable optical material is preferably a derivative of polyvinyl alcohol having a weight average molecular weight, $M_w$, of at least about 2,000 that, based on the number of hydroxy groups of the polyvinyl alcohol, has from about 0.5% to about 80% of units of formula I:

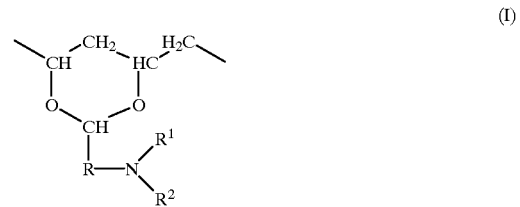

(I)

wherein:

R is lower alkylene having up to 8 carbon atoms, $R^1$ is hydrogen or lower alkyl and $R^2$ is an olefinically unsaturated, electron-attracting, copolymerizable radical preferably having up to 25 carbon atoms. $R^2$ is, for example, an olefinically unsaturated acyl radical of formula $R^3$—CO—, in which $R^3$ is an olefinically unsaturated copolymerizable radical having from 2 to 24 carbon atoms, preferably from 2 to 8 carbon atoms, especially preferably from 2 to 4 carbon atoms. Exemplary olefincally unsaturated copolymerizable radicals include ethenyl, 2-propenyl, 3-propenyl, 2-butenyl, hexenyl, octenyl and dedecanyl.

As a desirable embodiment, the radical $R^2$ is a radical of formula II

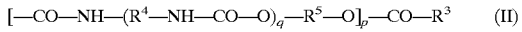

wherein p is zero or one, preferably zero;

q is zero or one, preferably zero;

$R^4$ and $R^5$ are each independently lower alkylene having from 2 to 8 carbon atoms, arylene having from 6 to 12 carbon atoms, a saturated divalent cycloaliphatic group having from 6 to 10 carbon atoms, arylenealkylene or alkylenearylene having from 7 to 14 carbon atoms, or arylenealkylenearylene having from 13 to 16 carbon atoms; and $R^3$ is as defined above.

Lower alkylene R preferably has up to 8 carbon atoms and may be straight-chained or branched. Suitable examples include octylene, hexylene, pentylene, butylene, propylene, ethylene, methylene, 2-propylene, 2-butylene and 3-pentylene. Preferably lower alkylene R has up to 6 and especially preferably up to 4 carbon atoms. Methylene and butylene are especially preferred. $R^1$ is preferably hydrogen or lower alkyl having up to seven, especially up to four, carbon atoms, especially hydrogen.

As for $R^4$ and $R^5$, lower alkylene $R^4$ or $R^5$ preferably has from 2 to 6 carbon atoms and is especially straight-chained. Suitable examples include propylene, butylene, hexylene, dimethylethylene and, especially preferably, ethylene. Arylene $R^4$ or $R^5$ is preferably phenylene that is unsubstituted or is substituted by lower alkyl or lower alkoxy, especially 1,3-phenylene or 1,4-phenylene or methyl-1,4-phenylene. A saturated divalent cycloaliphatic group $R^4$ or $R^5$ is preferably cyclohexylene or cyclohexylene-lower alkylene, for example cyclohexylenemethylene, that is unsubstituted or is substituted by one or more methyl groups, such as, for example, trimethylcyclohexylenemethylene, for example the divalent isophorone radical. The arylene unit of alkylenearylene or arylenealkylene $R^4$ or $R^5$ is preferably phenylene, unsubstituted or substituted by lower alkyl or lower alkoxy, and the alkylene unit thereof is preferably lower alkylene, such as methylene or ethylene, especially methylene. Such radicals $R^4$ or $R^5$ are therefore preferably phenylenemethylene or methylenephenylene. Arylenealkylenearylene $R^4$ or $R^5$ is preferably phenylene-lower alkylene-phenylene having up to 4 carbon atoms in the alkylene unit, for example phenyleneethylenephenylene. The radicals $R^4$ and $R^5$ are each independently preferably lower alkylene having from 2 to 6 carbon atoms, phenylene, unsubstituted or substituted by lower alkyl, cyclohexylene or cyclohexylene-lower alkylene, unsubstituted or substituted by lower alkyl, phenylene-lower alkylene, lower alkylene-phenylene or phenylene-lower alkylene-phenylene.

The polymerizable optical materials of the formula I is produced, for example, by reacting a polyvinylalcohol with a compound III,

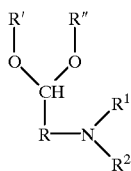

(III)

wherein R, $R^1$ and $R^2$ are as defined above, and R' and R" are each independently hydrogen, lower alkyl or lower alkanoyl, such as acetyl or propionyl. Preferably, between about 0.5 and about 80%, more preferably between about 1 and about 50%, most desirably between about 2 and about 15%, of the hydroxyl groups of the resulting the polymerizable optical material are replaced by the compound III.

Suitable polyvinylalcohols for the present derivatized polyvinylalcohol have a weight average molecular weight between about 2,000 and about 1,000,000, preferably between 10,000 and 300,000, more preferably between 10,000 and 100,000, and most preferably 10,000 and 50,000. The polyvinylalcohols have less than about 50%, preferably less than about 20%, of unhydrolyzed vinylacetate units. In addition, the polyvinyl alcohols may contain up to about 20%, preferably up to about 5%, of one or more of copolymer units, such as, ethylene, propylene, acrylamide, methacrylamide, dimethacrylamide, hydroxyethyl methacrylate, methyl methacrylate, methyl acrylate, ethyl acrylate, vinylpyrrolidone, hydroxyethyl acrylate, allyl alcohol and styrene.

The polyvinylalcohol derivative are polymerized in a solvent by a photocrosslinking process, e.g., using a UV laser, to produce an HOE. A suitable solvent is any solvent that dissolves polyvinyl alcohol and vinylic comonomers. Exemplary solvents include water, ethanol, methanol, propanol, dimethylformamide, dimethyl sulfoxide and mixtures thereof. To facilitate the photocrosslinking polymerization process, it is desirable to add a photoinitiator, which can initiate radical crosslinking. Exemplary photoinitators suitable for the present invention include benzoin methyl ether, 1-hydroxycyclohexylphenyl ketone, Durocure® 1173 and Irgacure® photoinitators. Preferably, between about 0.3 and about 2.0%, based on the total weight of the polymerizable formulation, of a photoinitiator is used. In accordance with the present invention, suitable concentrations of the polyvinylalcohol derivative in the solvent to produce the HOE are preferably between about 3 and about 90% by weight, more preferably between about 5% and 60%, most preferably between about 10% and about 50%, especially when the HOE is designed to be used as an ophthalmic lens.

Another group of exemplary biocompatible polymerizable optical materials suitable for the present invention is disclosed in U.S. patent application Ser. No. 08/875,340, (International Patent Application No. PCT/EP96/00246 to M ühlebach). The description of the polymerizable optical materials in the U.S. patent application is herein incorporated by reference. The suitable optical materials include azalactone-moiety containing derivatives of polyvinyl alcohol, polyethyleneimine or polyvinylamine which contain from about 0.5 to about 80%, based on the number of hydroxyl groups in the polyvinyl alcohol or the number of imine or amine groups in the polyethyleneimine or polyvinylamine, respectively, of units of the formula IV and V:

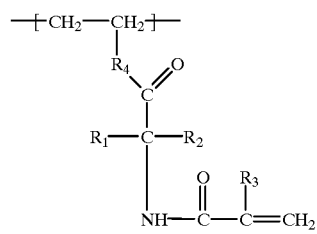

(IV)

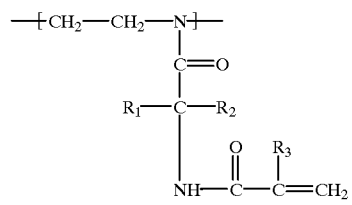

(V)

wherein $R_1$ and $R_2$ are, independently of one another, hydrogen, a $C_1$–$C_8$ alkyl group, an aryl group, or a cyclohexyl group, wherein these groups are unsubstitued or substituted; $R_3$ is hydrogen or a $C_1$–$C_8$ alkyl group, preferably is methyl; and $R_4$ is an —O— or —NH— bridge, preferably is —O—. Polyvinyl alcohols, polyethyleneimines and polyvinylamines suitable for the present invention have a number average molecular weight between about 2,000 and 1,000,000, preferably between 10,000 and 300, 000, more preferably between 10,000 and 100,000, and most preferably 10,000 and 50,000. A particularly suitable polymerizable optical material is a water-soluble derivative of a polyvinyl alcohol having between about 0.5 to about 80%, preferably between about 1 and about 25%, more preferably between about 1.5 and about 12%, based on the number of hydroxyl groups in the polyvinyl alcohol, of the formula IV that has methyl groups for $R_1$ and $R_2$, hydrogen for $R_3$, —O— (i.e., an ester link) for $R_4$.

The polymerizable optical materials of the formulae IV and V can be produced, for example, by reacting an azalactone of the formula VI,

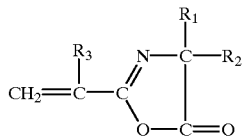

(VI)

wherein $R_1$, $R_2$ and $R_3$ are as defined above, with a polyvinyl alcohol, polyethyleneimine or polyvinylamine at elevated temperature, between about 55° C. and 75° C., in a suitable organic solvent, optionally in the presence of a suitable catalyst. Suitable solvents are those which dissolve the polymer backbone and include aprotic polar solvents, e.g., formamide, dimethylformamide, hexamethylphosphoric triamide, dimethyl sulfoxide, pyridine, nitromethane, acetonitrile, nitrobenzene, chlorobenzene, trichloromethane and dioxane. Suitable catalyst include tertiary amines, e.g., triethylamine, and organotin salts, e.g., dibutyltin dilaurate.

In addition to the azalactone moiety, the azalactone-moiety containing optical materials can have other hydrophobic and hydrophilic vinylic comonomers, depending on the desired physical properties of the polymerized HOE. Exemplary suitable hydrophobic comonomers include $C_1$–$C_{18}$ alkyl acrylates and methacrylates, $C_3$–$C_{18}$ alkylacrylamides and methacrylamides, acrylonitrile, methacrylonitrile, vinyl $C_1$–$C_{18}$ alkanoates, $C_2$–$C_{18}$ alkenes, styrene, vinyl alkyl ethers, $C_2$–$C_{10}$ perfluoroalkyl acrylates and methacrylates, $C_3$–$C_{12}$ perfluoroalkyl ehtylthiocarbonylaminoethyl acrylates and methacrylates, acryloxy- and methacryloxy-lakylsiloxanes, N-vinylcarbazole, $C_1$–$C_{12}$ alky esters of maleic acid, fumaric acid, itaconic acid and the like. Exemplary suitable hydrophilic comonomers include hydroxyalkyl acrylates and methacrylates, acrylamide, methacrylamide, methoxylated acrylates and methacrylates, hydroxyalkyl amides and methacrylamides, N-vinylpyrrole, N-vinylsuccinimide, N-vinylpyrrolidone, vinylpyridine, acrylic acid, methacrylic acid and the like.

The azalactone-moiety containing optical materials are polymerized in a solvent by a photocrosslinking process, e.g., using a UV laser, to produce an HOE. A suitable solvent is any solvent that dissolves the polymer backbone of the optical materials. Exemplary solvents include aprotic solvents disclosed above in conjunction with the azlactone modification, water, ethanol, methanol, propanol, glycols, glycerols, dimethylformamide, dimethyl sulfoxide and mixtures thereof. To facilitate the photocrosslinking polymerization process, it is desirable to add a photoinitiator, which can initiate radical crosslinking. Exemplary photoinitators suitable for the present invention include benzoin methyl ether, 1-hydroxycyclohexylphenyl ketone, Durocure® 1173 and Irgacure® photoinitators. Preferably, between about 0.3 and about 2.0%, based on the total weight of the polymerizable formulation, of a photoinitiator is used. In accordance with the present invention, suitable concentrations of the azalactone-moiety containing optical material in the solvent to produce the HOE are preferably between about 3 and about 90% by weight, more preferably between about 5% and 60%, most preferably between about 10% and about 50%, especially when the HOE is designed to be used as an ophthalmic lens.

Yet another group of biocompatible polymerizable optical materials suitable for the present invention is a finctionalized copolymer of a vinyl lactam and at least one additional vinyl monomer, a second vinyl monomer. The copolymer is functionalized with a reactive vinyl monomer. The vinyl lactam of the present invention is a five to seven membered lactam of formula VII

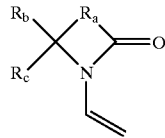

(VII)

wherein
$R_a$ is an alkylene bridge having from 2 to 8 carbon atoms;
$R_b$ is hydrogen, alkyl, aryl, aralkyl or alkaryl, preferably hydrogen, lower alkyl having up to 7 carbon atoms, aryl having up to 10 carbon atoms, or aralkyl or alkaryl having up to 14 carbon atoms; and
$R_c$ is hydrogen or lower alkyl having up to 7 carbon atoms, preferably methyl, ethyl or propyl.

Exemplary vinyl lactams suitable for the invention include N-vinyl-2-pyrrolidone, N-vinyl-2-caprolactam, N-vinyl-3-methyl-2-pyrrolidone, N-vinyl-3-methyl-2-piperidone, N-vinyl-3-methyl-2-caprolactam, N-vinyl-4-methyl-2-pyrrolidone, N-vinyl-4-methyl-2-caprolactam, N-vinyl-5-methyl-2-pyrrolidone, N-vinyl-5-methyl-2-piperidone, N-vinyl-5,5-dimethyl-2-pyrrolidone, N-vinyl-3,3,5-trimethyl-2-pyrrolidone, N-vinyl-5-methyl-5-ethyl-2-pyrrolidone, N-vinyl-3,4,5-trimethyl-3-ethyl-2-pyrrolidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam and mixtures thereof. Preferred vinyl lactams are heterocyclic monomers of formula VII containing from 4 to 6 carbon atoms in the heterocyclic ring. More preferred vinyl lactams have a heterocyclic monomer of formula VII, in which the heterocyclic ring has 4 carbon atoms and $R_b$ and $R_c$ are independently selected from hydrogen and lower alkyl moieties. A highly suitable vinyl lactam is N-vinyl-2-pyrrolidone.

Suitable second vinyl monomers include functional vinyl monomers that have in addition to the vinyl group a functional group, for example, hydroxy, amino, lower alkyl-substituted amino, carboxyl, esterified caboxyl, alkoxycarbonyl, epoxy or sulfo (—$SO_3H$). The functional group is retained when the vinyl group of the second vinyl monomer is reacted with the vinyl lactam to produce a polymer chain, and can be used to modify or functionalize the polymer.

Suitable functional vinyl monomers include hydroxy-substituted lower alkyl acrylates and methacrylates, ethoxylated acrylates and methacrylates, epoxy-lower alkyl acrylates and methacrylates, epoxycycloalkyl-lower alkyl acrylates and methacrylates, hydroxy-substituted lower alkyl acrylamides and methacrylamides, hydroxy-substituted lower alkyl vinyl ethers, amino- or hydroxy-substituted styrenes, sodium ethylenesulfonate, sodium styrenesulfonate, 2-acrylamido-2-methylpropanesulfonic acid, acrylic acid, methacrylic acid, amino-lower alkyl and alkylamino-lower alkyl acrylates and methacrylates, acryloxy- and methacryloxy-lower alkylmalemides, and allyl alcohol. The term "lower alkyl" as used herein refers to an alkyl radical having up to 7 carbon atoms, preferably up to 4 carbon atoms. Particularly suitable functional vinyl monomers include 2-hydroxyethyl methacrylate, 3-hydroxypropyl methacrylate, acrylic acid, methacrylic acid, 4-aminostyrene, 3-methacryloxymethyl-7-oxa-bicyclo [4.1.0] heptane, N-methacryloxyethyl-maleimide, glycidyl methacrylate, ammonium ethyl methacrylate hydrochloride and ammonium propyl methacrylate hydrochloride.

A copolymer of the vinyl lactam and the second vinyl monomer is produced with or without a solvent in a known manner. The copolymer can also be a statistical polymer. A process for producing a statistical polymer is disclosed in, for example, U.S. Pat. No. 5,712,356. A suitable solvent dissolves and is substantially inert towards the monomers and the polymer produced from the monomers. Exemplary suitable solvents include water; alcohols, e.g., methanol, ethanol and propanol; carboxylic acid amides, e.g., dimethylformamide and dimethyl sulfoxide; ethers, e.g., diethyl ether, THF and diglymes; and mixtures thereof. Suitable copolymers have a weight average molecular weight between about 2,000 and about 1,000,000, preferably between 10,000 and 300,000, more preferably between 10,000 and 100,000, and most preferably 10,000 and 50,000.

The copolymer is further modified with a reactive vinyl monomer to produce a rapidly crosslinkable polymer. Suitable reactive vinyl monomers have in addition to the vinyl group a reactive moiety, which reacts with a functional group present in the copolymer to form a covalent bond while retaining the vinyl group of the monomer. Exemplary suitable reactive vinyl monomers include hydroxy-substituted lower alkyl acrylates and methacrylates, hydroxy-substituted lower alkyl acrylamides and methacrylamides, hydroxy-substituted lower alkyl vinyl ether, 2-acrylamido-2-methylpropanesulfonic acid, amino-lower alkyl and mono-lower alkylamino-lower alkyl acrylates and methacrylates, allyl alcohol, epoxy-lower alkyl acrylates and methacrylates, isocyanato-lower alkyl acrylates and methacrylates, vinylically unsaturated carboxylic acids having 3 to 7 carbon atoms and acid chlorides and anhydrides thereof, amino-, hydroxy- or isocyanate-substituted styrenes, and epoxycycloalkyl-lower alkyl acrylates and methacrylates. Preferred reactive vinyl monomers include hydroxyethyl acrylate and methacrylate, hydroxypropyl acrylate and methacrylate, isocyantoethyl acrylate and methacrylate, acrylic and methacrylic acid chloride, ammonium ethyl methacrylate hydrochloride, and ammonium propyl methacrylate hydrochloride.

The finctionalized copolymer is typically crosslinked or polymerized in a solvent by a photocrosslinking process, e.g., using a UV laser, to produce an HOE, although the copolymer can be crosslinked or polymerized in the absence of a solvent. A suitable solvent is any solvent that dissolves the polymer backbone of the polymer. Exemplary solvents include water; alcohols, e.g., methanol and ethanol; carboxylic acid amides, e.g., dimethylformamide and dimethyl sulfoxide; and mixtures thereof. The photocrosslinking process is facilitated by a photoinitiator, which can initiate radical crosslinking. Exemplary photoinitators suitable for the present invention include benzoin methyl ether, 1-hydroxycyclohexylphenyl ketone, Durocure® 1173 and Irgacure® 2959. Preferably, between about 0.3 and about 2.0%, based on the total weight of the polymerizable formulation, of a photoinitiator is used. In accordance with the present invention, suitable concentrations of the functionalized vinyl lactam copolymer in the solvent to produce the HOE are preferably between about 3% and about 90% by weight, more preferably between about 5% and 60%, most preferably between about 10% and about 50%, especially when the HOE is designed to be used as an ophthalmic lens.

Another group of HOEs suitable for the present invention can be produced from conventional and other volume transmission holographic optical element recording media. As with the above-described polymerizable materials for HOEs, first light and collimated reference light are simultaneously projected onto an HOE recording medium such that the electromagnetic waves of the object and reference light form interference fringe patterns. The interference fringe patterns, i.e., volume grating structure, are recorded in the HOE medium. When the HOE recording medium is fully exposed, the recorded HOE medium is developed in accordance with a known HOE developing method. Suitable volume transmission holographic optical element recording media include commercially available holographic photography recording materials or plates, such as dichromatic gelatins. Holographic photography recording materials are available from various manufacturers, including Polaroid Corp. Other holographic media suitable for the present invention are disclosed, for example, in International Patent Application No. PCT/US96/15600 to Polaroid and U.S. Pat. No. 5,453,340 to Nippon Paint. When photographic recording materials are used as the HOE, however, toxicological effects of the materials on the ocular environment must be considered. Accordingly, when a conventional photographic HOE material is used, it is preferred that the HOE is encapsulated in a biocompatible optical material.

As for the first optical material of the ophthalmic lens, an optical material suitable for a hard lens, gas permeable lens or hydrogel lens can be used. Suitable polymeric materials for the first optical material include hydrogel materials, rigid gas permeable materials and rigid materials that are known to be useful for producing ophthalmic lenses, e.g., contact lenses. Suitable hydrogel materials typically have a crosslinked hydrophilic network and hold between about 35% and about 75%, based on the total weight of the hydrogel material, of water. Examples of suitable hydrogel materials include copolymers having 2-hydroxyethyl methacrylate and one or more comonomers such as 2-hydroxy acrylate, ethyl acrylate, methyl methacrylate, vinyl pyrrolidone, N-vinyl acrylamide, hydroxypropyl methacrylate, isobutyl methacrylate, styrene, ethoxyethyl methacrylate, methoxy triethyleneglycol methacrylate, glycidyl methacrylate, diacetone acrylamide, vinyl acetate, acrylamide, hydroxytrimethylene acrylate, methoxy methyl methacrylate, acrylic acid, methacrylic acid, glyceryl ethacrylate and dimethylamino ethyl acrylate. Other suitable hydrogel materials include copolymers having methyl vinyl carbazole or dimethylamino ethyl methacrylate. Another group of suitable hydrogel materials include polymerizable materials such as modified polyvinyl alcohols, polyethyleneimines and polyvinylamines, for example, disclosed in U.S. Pat. No. 5,508,317, issued to Beat Müller and International Patent Application No. PCT/EP96/01265. Yet another group of highly suitable hydrogel materials include silicone copolymers disclosed in International Patent Application No. PCT/EP96/01265. Suitable rigid gas permeable materials for the present invention include cross-linked siloxane polymers. The network of such polymers incorporates appropriate cross-linkers such as N,N'-dimethyl bisacrylamide, ethylene glycol diacrylate, trihydroxy propane triacrylate, pentaerythtritol tetraacrylate and other similar polyfunctional acrylates or methacrylates, or vinyl compounds, e.g., N-m,ethylamino divinyl carbazole. Suitable rigid materials include acrylates, e.g., methacrylates, diacrylates and dimethacrylates, pyrolidones, styrenes, amides, acrylamides, carbonates, vinyls, acrylonitrieles, nitriles, sulfones and the like. Of the suitable materials, hydrogel materials are particularly suitable for the present invention.

In accordance with the present invention, HOEs of the present invention preferably have a diffraction efficiency of at least about 70%, more preferably at least about 80%, most preferably at least 95%, over all or substantially all wavelengths within the visible spectrum of light. Especially suitable HOEs for the present invention have a diffraction efficiency of 100% over all wavelengths of the spectrum of visible light when Bragg condition is met. Accordingly, a volume HOE is particularly suitable for the present invention. However, HOEs having a lower diffraction efficiency than specified above can also be utilized for the present invention. The Bragg condition is well known in the optics art, and it is, for example, defined in *Coupled Wave Theory for Thick Hologram Gratings*, by H. Kogelnik, The Bell System Technical Journal, Vol. 48, No. 9, p 2909–2947 (November 1969). The description of the Bragg condition disclosed therein is incorporated by reference. The Bragg condition can be expressed as $$\cos(\phi-\theta)=K/2B$$

wherein $K=2\pi/\Lambda$, $\Lambda$=the grating period of the interference fringes, $\theta$ is the incident angle of incoming light, $\phi$ is the slant angle of the grating and B is the average propagation constant, which can be expressed as $B=2\pi n/\lambda$, wherein n is the average refractive index and $\lambda$ is the wavelength of the light. When the Bragg condition is met, up to 100% of incoming light can be coherently diffracted.

Figure 7:
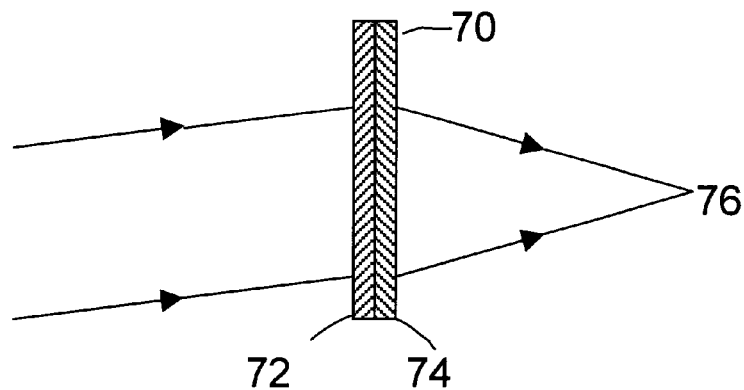
FIGS. 7, 7A, and 7B illustrate a combination holographic optical element.
Figure 7A:
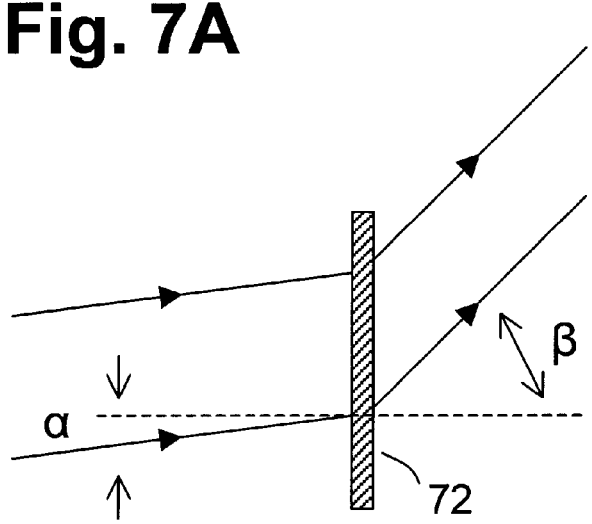
Figure 7B:
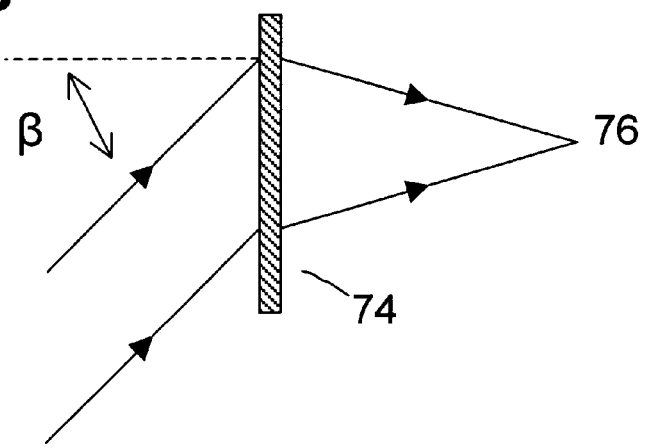

Suitable HOEs for the present invention preferably are multilayer combination HOEs having at least two layers of HOEs since layering thin HOEs improves the diffractive efficiency and the optical quality of the HOE and enables the thickness of the HOE to be reduced. As is known in the ophthalmic art, an ophthalmic lens should have a thin dimensional thickness to promote comfort of the lens wearer. Accordingly, a dimensionally thin HOE is preferred for the present invention. However, in order to provide an HOE having a high diffractive efficiency, the HOE has to be optically thick, i.e., the light is diffracted by more than one plane of the interference fringe pattern. One way to provide an optically thick and dimensionally thin HOE is programming the interference fringe pattern in a direction that is slanted towards the length of the HOE. Such slanted volume grating structure renders the HOE to have a large angular deviation between the incident angle of the incoming light and the exiting angle of the exiting light. However, an HOE having a large angular deviation may not be particularly suitable for an ophthalmic lens. For example, when such an HOE is placed on the eye, the line of sight is significantly bent away from the normal line of sight of the eye. As a preferred embodiment of the present invention, this angular limitation in designing an HOE is addressed by utilizing a multilayer combination HOE, especially a bilayer HOE. FIG. 7 illustrates an exemplary combination HOE 70 of the present invention. Two dimensionally thin HOEs having a large angular deviation are fabricated into a combination HOE to provide a dimensionally thin HOE that has a small angular deviation. The multilayer HOE 70 has a dimensionally thin first HOE 72 and a thin second HOE 74. The first HOE 72 is programmed to diffract the incoming light such that when light enters the HOE at an angle $\alpha$, the light exiting the HOE 72 forms an exiting acute angle $\beta$, which is larger than the incident angle $\alpha$, as shown in FIG. 7A. Preferably, the first HOE has a thickness between about 10 $\mu$m and about 100 $\mu$m, more preferably between about 20 $\mu$m and about 90 $\mu$m, most preferably between about 30 $\mu$m and about 50 $\mu$m. The second HOE 74, FIG. 7B, is programmed to have a activating incident angle $\beta$ that matches the exiting angle $\beta$ of the first HOE 72. In addition, the second HOE 74 is programmed to focus the incoming light to a focal point 76 when the light enters within the activating angle $\beta$. FIG. 7B illustrates the second HOE 74. Preferably, the second HOE has a thickness between about 10 $\mu$m and about 100 $\mu$m, more preferably between about 20 $\mu$m and about 90 $\mu$m, most preferably between about 30 $\mu$m and about 50 $\mu$m.

When the first HOE 72 is placed next to the second HOE 74 and the incoming light enters the first HOE 72 at an angle that corresponds to the angle $\alpha$, the path of the light exiting the combination HOE 70 is modified and the light is focused to the focal point 76. By utilizing a multilayer combination HOE, a dimensionally thin HOE having a high diffractive efficiency and a small angular deviation can be produced. In addition to the high diffractive efficiency and small angular deviation advantages, utilizing a multilayer HOE provides other additional advantages, which include correction of dispersion aberration and chromatic aberration. A single HOE may produce images having dispersion and chromatic aberrations since visual light consists of a spectrum of electromagnetic waves having different wave lengths and the differences in wavelengths may cause the electromagnetic waves to diffract differently by the HOE. It has been found that a multilayer, especially bilayer, HOE can counteract to correct these aberrations that may be produced by a single layer HOE. Accordingly, a multilayer combination HOE is preferred.

The ophthalmic lens production method of the present invention is a highly flexible method that can be used to produce ophthalmic lenses having a wide range of corrective powers and that produces ophthalmic lenses that are designed to promote the comfort of the lens wearer. Unlike conventional ophthalmic lenses, the corrective power or powers of the present ophthalmic lens provides the corrective power or powers by programming suitable powers into the lens, without the need for changing the dimensions of the lens. As discussed above, different corrective powers can be programmed into the ophthalmic lens by, for example, changing the distance, pattern and/or configuration of the object light and the reference light. Accordingly, the lens production process is highly simplified. Additional advantages include the fact that ophthalmic lens manufacturers do not need to have different lens manufacturing equipment and methods to produce a wide range of different lenses having different corrective powers. It is to be noted that although the present invention is described in conjunction with ophthalmic lenses, corrective spectacle lenses having a volume HOE can be produced in accordance with the present invention. For example, a dimensionally thin film of an HOE, which is programmed to provide a corrective power, can be laminated on a plano spectacle lens. Such spectacle lenses, i.e., eyeglass lenses, can be designed to promote the comfort of the wearer without sacrificing the corrective efficacy of the lenses since the corrective HOE lens does not rely on the thickness of the lens to provide the corrective power, as discussed above.

The present invention is further illustrated with the following examples. However, the examples are not to be construed as limiting the invention thereto.

EXAMPLES

Example 1

About 0.06 ml of the Nelfilcon A lens monomer composition is deposited in the center portion of a female mold half, and a matching male mold half is placed over the female mold half, forming a lens mold assembly. The male mold half does not touch the female mold half, and they are separated by about 0.1 mm. The lens mold halves are made from quartz and are masked with chrome, except for the center circular lens portion of about 15 mm in diameter. Briefly, Nelfilcon A is a product of a crosslinkable modified polyvinyl alcohol which contains about 0.48 mmol/g of an acryamide crosslinker. The polyvinyl alcohol has about 7.5 mol% acetate content. Nelfilcon A has a solid content of about 31% and contains about 0.1% of a photoinitiator, Durocure® 1173. The closed lens mold assembly is placed under a laser set up. The laser set up provides two coherent collimated UV laser beams having 351 nm wavelength, in which one beam is passed through an optical convex lens so that the focal point is formed at 500 mm away from the lens mold assembly. The focused light serves as a point-source first light. The angle formed between the paths of the first light and the reference light is about 7°. The set up provides an HOE having an added corrective power of 2 diopters. The lens monomer composition is exposed to the laser beams having about 0.2 watts for about 2 minutes to completely polymerize the composition and to form a volume grating structure. Since the lens mold is masked except for the center portion, the lens monomer exposed in the circular center portion of the mold is subjected to the first light and the reference light and polymerized.

The mold assembly is opened, leaving the lens adhered to the male mold half. About 0.06 ml of the Nelfilcon A lens monomer composition is again deposited in the center portion of the female mold half, and the male mold half with the formed lens is placed over the female mold half. The male and female mold halves are separated by about 0.2 mm. The closed mold assembly is again exposed to the laser set up, except that the optical convex lens is removed from the first light set up. The monomer composition is again exposed to the laser beams for about 2 minutes to completely polymerize the composition. The resulting composite lens has an optical power based on the shape of the lens and the refractive index of the lens material, and an activatable additional corrective power of +2 diopters.

Example 2

Example 1 is repeated except that the convex optical lens for the first light is replaced with a cylindrical lens. The cylindrical lens provides a line-source light which is vertically oriented. The resulting composite lens has an optical power based on the shape of the lens and the refractive index of the lens material, and an additional cylindrical power of +2 diopters with a cylindrical axis of 90°. The composite lens is suitable for correcting an astigmatic condition.

What is claimed is:

1. A contact lens for correcting astigmatism, comprising a volume holographic element, wherein said holographic element has a volume grating structure which provides one or more of corrective powers comprising a cylindrical power.

2. The contact lens of claim 1 wherein said lens further provides a spherical power.

3. The contact lens of claim 2 wherein said spherical power is provided by said volume grating structure.

4. The contact lens of claim 2 wherein said spherical power is a refractive power provided by the contour of said ophthalmic lens.

5. The contact lens of claim 1 wherein said lens has a stabilizing mechanism.

6. The ophthalmic lens of claim 1 wherein said holographic element comprises a biocompatible optical material.

7. The ophthalmic lens of claim 6 wherein said lens is a composite lens.

8. A contact lens comprising a transmission volume holographic element, wherein said holographic element has a volume grating structure that provides an optical power.

9. The contact lens of claim 8 wherein said holographic element is a biocompatible optical element.

10. The contact lens of claim 8 wherein said lens is a composite lens.

11. A contact lens for correct astigmatism, comprising a volume holographic element, wherein said holographic element has a volume grating structure which is programmed to provide a cylindrical power.

12. The contact lens of claim 11 wherein said lens has a stabilizing mechanism.

13. The contact lens of claim 11 wherein said holographic element comprises a biocompatible optical element.

14. The contact lens of claim 11 wherein said lens further provides a spherical power.

15. The contact lens of claim 14 wherein said spherical power is a minus power.

16. The contact lens of claim 14 wherein said spherical power is a plus power.

* * * * *